United States Patent
Nishida et al.

(10) Patent No.: US 7,718,265 B2
(45) Date of Patent: May 18, 2010

(54) RELEASE SHEET

(75) Inventors: Takuo Nishida, Saitama (JP); Sou Miyata, Chiba (JP); Toshio Sugizaki, Saitama (JP)

(73) Assignee: Lintec Corporation, Tokyo (JP)

( * ) Notice: Subject to any disclaimer, the term of this patent is extended or adjusted under 35 U.S.C. 154(b) by 287 days.

(21) Appl. No.: 11/683,720

(22) Filed: Mar. 8, 2007

(65) Prior Publication Data

US 2007/0231567 A1  Oct. 4, 2007

(30) Foreign Application Priority Data

Mar. 28, 2006  (JP) .............................. 2006-087861

(51) Int. Cl.
*B32B 27/40* (2006.01)
(52) U.S. Cl. ................. 428/423.1; 428/423.9
(58) Field of Classification Search ........................ None
See application file for complete search history.

(56) References Cited

U.S. PATENT DOCUMENTS

| 4,660,228 | A | * | 4/1987 | Ogawa et al. ................... 2/167 |
| 4,981,739 | A | * | 1/1991 | Gibbons et al. ............ 428/34.2 |
| 7,312,293 | B2 | * | 12/2007 | Beppu et al. ................. 526/318 |
| 2004/0175573 | A1 | * | 9/2004 | Fujihana ................... 428/423.1 |

* cited by examiner

*Primary Examiner*—Sheeba Ahmed
(74) *Attorney, Agent, or Firm*—Oblon, Spivak, McClelland, Maier & Neustadt, L.L.P.

(57) ABSTRACT

Provided is a release sheet which is non-silicone-based and has a good releasability from a layer of a pressure sensitive adhesive and which has a stable antistatic property without being influenced by the air environment and is free of bleeding out of ionic substances derived from an antistatic agent. The release sheet is prepared by providing an undercoat layer containing a polyurethane-based resin and 0.1 to 45% by mass of a lithium salt-based antistatic agent and a layer of a rubber-based release agent formed by coating and drying a liquid containing a release agent in order on a substrate.

14 Claims, No Drawings

RELEASE SHEET

BACKGROUND OF THE INVENTION

1. Field of the Invention

The present invention relates to a release sheet. More specifically, it relates to a non-silicone-based release sheet which has a good releasability from a layer of a pressure sensitive adhesive and which has an excellent antistatic property and is suitably used for applications related to precision electronic devices since it is free of bleeding out of metal ions and ionic inorganic substances (hereinafter occasionally referred to as "ionic substances") derived from an antistatic agent.

2. Description of the Related Art

In recent years, a pressure sensitive adhesive sheet is used in various forms at various stages of production steps for precision electronic devices such as ceramic condensers, hard disc drives, semiconductor equipments and the like.

In a pressure sensitive adhesive sheet used at such production steps for precision electronic devices, a silicone-based pressure sensitive adhesive is likely to cause troubles in electronic parts due to low molecular weight silicone compounds contained therein, and therefore non-silicone-based pressure sensitive adhesives, for example, acryl-based pressure sensitive adhesives, polyester-based pressure sensitive adhesives, polyurethane-based pressure sensitive adhesives and the like are usually used.

In the above non-silicone-based pressure sensitive adhesives, a release sheet comprising a layer of a release agent provided on a substrate is laminated thereon in order to protect a layer of a pressure sensitive adhesive until use.

A silicone-based release agent is often used for a layer of a release agent in a release sheet in general applications, and when used for electronic parts and the like, the electronic parts and the like are likely to bring about troubles by silicone compounds transferred to the layer of a pressure sensitive adhesive.

Accordingly, alkyd-based resins (refer to, for example, JP 1982-049685A) and long-chain alkyl-based resins (refer to, for example, JP 2002-249757 A) which are known as non-silicone-based release agents are tried to use for a layer of a release agent in a release sheet used for the applications described above.

However, when the above resins are used for a layer of a release agent, brought about is the problem that because of a high releasing strength required for releasing from a layer of a pressure sensitive adhesive, the layer of a pressure sensitive adhesive is not released from the layer of a release agent in a certain case.

Accordingly, a release sheet in which polybutadiene known as a rubber-based resin is used for a layer of a release agent and in which polyurethane is used for an undercoat layer is proposed as a non-silicone-based release sheet which has a good releasability from a layer of a pressure sensitive adhesive and which is excellent in an adhesion between a layer of a release agent and a substrate (refer to, for example, JP 2005-199586 A).

However, since both of the above materials have a high insulation property, releasing charge caused in releasing and delivering charge brought about when delivered from a roll can not be inhibited, and involved therein is the problem that troubles such as attracting of dirts, dusts and the like brought about.

A method in which an antistatic agent is added to a layer of a release agent is proposed as well in order to solve the above problem (refer to, for example, JP 1998-086289 A). However, involved in the above method is the problem that ionic substances contained in the antistatic agent bleed out to cause heavier releasing and whitening of a coated surface or pass through the pressure sensitive adhesive to bring about corrosion of internal elements in semiconductor devices and the like.

SUMMARY OF THE INVENTION

In light of the situation described above, an object of the present invention is to provide a release sheet which is a non-silicone-based release sheet and has a good releasability from a layer of a pressure sensitive adhesive and which has an excellent antistatic property and is free of bleeding out of ionic substances derived from an antistatic agent.

Intensive researches repeated by the present inventors in order to achieve the object described above have resulted in finding that the above object can be achieved by providing an undercoat layer containing a polyurethane-based resin and a specific amount of a lithium salt-based antistatic agent on a substrate and forming a layer of a release agent comprising a rubber-based resin on the undercoat layer. The present invention has been completed based on the above finding.

That is, the present invention provides the following release sheet.

(1) A release sheet characterized by providing an undercoat layer containing a polyurethane-based resin and 0.1 to 45% by mass of a lithium salt-based antistatic agent and a layer of a rubber-based release agent formed by coating and drying a liquid containing a release agent in order on a substrate.
(2) The release sheet as claimed in the above item (1), wherein the liquid containing a release agent is coated, dried and cured by irradiating with an active energy beam to thereby form the layer of a rubber-based release agent.
(3) The release sheet as claimed in the above item (2), wherein the active energy beam is an ultraviolet ray.
(4) The release sheet as claimed in any one of the above items (1) to (3), wherein the undercoat layer has a thickness of 0.05 to 2 μm
(5) The release sheet as claimed in any one of the above items (1) to (4), wherein the layer of a rubber-based release agent has a thickness of 0.05 to 0.5 μm.

The release sheet of the present invention is improved in a releasability from a layer of a pressure sensitive adhesive and provided with an excellent antistatic property by assuming the constitution described above. Further, in the above release sheet, ionic substances derived from the antistatic agent are inhibited from bleeding out onto the surface of the layer of a release agent, and influences such as shift to heavier releasing and whitening of a coated surface and passing through the pressure sensitive adhesive to bring about corrosion of internal elements in semiconductor devices and the like are not exerted on physical properties and surface states in releasing.

The release sheet of the present invention is prepared by providing an undercoat layer containing a polyurethane-based resin and a lithium salt-based antistatic agent and a layer of a rubber-based release agent in order on a substrate.

The substrate in the release sheet of the present invention shall not specifically be restricted, and there can be used a substrate suitably selected from substrates which have so far been publicly known as substrates for a release sheet.

The above substrate includes, for example, paper substrates such as glassine paper, coated paper, cast-coated paper, lint-free paper and the like, laminated papers prepared by laminating thermoplastic resins such as a polyethylene on the above paper substrates, polyester films of polyethylene terephthalate, polybutylene terephthalate, polyethylene naphthalate and the like, polyolefin films of polypropylene, polymethylpentene and the like, plastic films such as a polycarbonate film, a cellulose acetate-based film and the like and laminated sheets comprising the above materials. A thickness of the above substrates shall not specifically be restricted, and usually it is preferably 10 to 150 μm.

When a plastic film is used as the substrate, a surface of the above plastic film of a side on which the undercoat layer is provided can be subjected, if necessary, to physical or chemical treatments such as an oxidation method and a roughening method for the purpose of enhancing an adhesion between the plastic film and the undercoat layer.

The oxidation method described above includes, for example, a corona discharge treatment, a chromic acid treatment, a flame treatment, a hot blast treatment, an ozone and ultraviolet ray irradiation treatment and the like. The roughening method described above includes, a sand blast method, a solvent treatment method and the like.

The above surface treatment methods are suitably selected according to the kind of the substrate, and in general, a corona discharge treatment method preferably used in terms of an effect and an operationality. Further, it can be subjected as well to a primer treatment.

In the release sheet of the present invention, a material for forming the undercoat layer has a solvent resistance (insoluble) against a solvent used for a liquid containing a release agent and an excellent rubber elasticity, and therefore a polyurethane-based resin is used therefor. Capable of being given as the polyurethane-based resin are constitutions containing compounds comprising long chain polyols such as polyesterpolyols, polyetherpolyols and the like, diisocyanates such as TDI (tolylenediisocyanate), MDI (diphenylmethanediisocyanate), HDI (hexamethylenediisocyanate) and the like and a chain extender such as low molecular weight polyhydric alcohols, aromatic diamines and the like.

The present invention is characterized by adding a lithium salt-based antistatic agent to the undercoat layer. The lithium salt-based antistatic agent used in the present invention includes carboxylic acid lithium salts such as aliphatic monocarboxylic acid lithium salts, polyoxyethylene alkyl ether carboxylic acid lithium salts, N-acylsarcosinic acid lithium salts and N-acylglutamic acid lithium salts, sulfonic acid lithium salts such as dialkylsulfosuccinic acid lithium salts, alkanesulfonic acid lithium salts, α-olefinsulfonic acid lithium salts, linear alkylbenzenesulfonic acid lithium salts, alkylbenzenesulfonic acid lithium salts and alkylnaphthalenesulfonic acid lithium salts, sulfuric ester lithium salts such as alkylsulfuric ester lithium salts, phosphoric ester lithium salts such as alkylphosphoric ester lithium salts, polyoxyethylene alkyl ether phosphoric acid lithium salts and polyoxyethylene alkyl phenyl ether phosphoric acid lithium salts, lithium nitride salts, lithium bis(trifluoromethanesulfonyl)imide and lithium (trifluoromethanesulfonyl)methide. In particular, lithium bis(trifluoromethanesulfonyl)imide is suitably used in order to obtain the release sheet in which a layer of a release agent is excellent, as described later, in smoothness and in which ionic substances contained in the antistatic agent are inhibited from bleeding out by chemically bonding with the resin of the undercoat layer.

A content of the lithium salt-based antistatic agent contained in the undercoat layer is 0.1 to 45% by mass, preferably 2 to 30% by mass. Setting the content to 0.1% by mass or more makes it possible to allow the antistatic resistance to be exhibited, and setting it to 45% by mass or less makes it possible to prevent bleeding out of the ionic substances onto the surface of the layer of a release agent, heavier releasing and whitening of the coated surface.

The undercoat layer can be formed by coating and drying an undercoat liquid prepared by dissolving the materials described above, an isocyanate compound, for example, TDI (tolylenediisocyanate) and MDI (diphenylmethanediisocyanate) in a solvent.

Further, it is cured by irradiating, if necessary, with an active energy beam after coating and drying, whereby the solvent resistance and the adhesion to the substrate can be enhanced.

Solvents suitably selected from publicly known solvents having a good solubility to the undercoat components can be used as the solvent used in the above case. The above solvents include, for example, organic solvents such as toluene, xylene, methanol, ethanol, isobutanol, n-butanol, acetone, methyl ethyl ketone, tetrahydrofuran, heptane, cyclohexanone and the like. Those may be used alone or in combination of two or more kinds thereof.

The undercoat liquid is preferably prepared using the above solvents in terms of convenience in coating so that a solid matter concentration falls in a range of 0.1 to 15% by mass.

The undercoat liquid can be coated on the substrate described above by coating methods which have so far been publicly known, for example, a bar coating method, a reverse roll coating method, a knife coating method, a roll knife coating method, a gravure coating method, an air doctor coating method and a doctor blade coating method.

The undercoat liquid is coated on the substrate described above and dried by heating at a temperature of 40 to 160° C. for 30 seconds to 2 minutes, whereby an undercoat layer is formed.

A thickness of the undercoat layer in drying is preferably 0.05 to 2 μm, more preferably 0.1 to 1.2 μm. The stable releasing strength is obtained by setting the thickness to 0.05 μm or more, and the surface staying in a good state is obtained by setting it to 2 μm or less.

In the release sheet of the present invention, a liquid containing the rubber-based release agent is coated and dried on the substrate on which the undercoat layer described above is provided, and it is cured by irradiating, if necessary, with an active energy beam, whereby a layer of a release agent is formed.

The rubber-based release agent includes synthetic rubbers, for example, a butadiene-based, a styrene/butadiene-based, a chloroprene-based, a butyl-based, an ethylene/propylene-based, and an acryl-based rubbers. In particular, the butadiene-based one is suitably used.

When the layer of a release agent is formed in the present invention, an antioxidant is preferably added. The antioxidant shall not specifically be restricted, and any one of publicly known phosphate-based antioxidants, organic sulfur-based antioxidants, hindered phenol-based antioxidants and the like can be used.

The above antioxidants may be used alone or in combination of two or more kinds thereof. A use amount thereof is preferably 0.1 part by mass or more based on 100 parts by mass of the solid matter of the rubber-based release agent from the viewpoint of inhibiting heavier releasing due to degradation of the rubber-based release agent, and it is preferably 20 parts by mass or less based on 100 parts by mass of the solid matter of the rubber-based release agent from the viewpoint of maintaining sufficiently an adhesion between the release agent and the substrate of the release sheet.

The liquid containing the rubber-based release agent in the present invention is prepared by dissolving the rubber-based release agent and other components such as an antioxidant and the like which are blended if necessary in a solvent.

Solvents suitably selected from publicly known solvents having a good solubility to the blended components can be used as the solvent used in the above case. The above solvents include the same solvents as those given as the examples which can be used for the undercoat liquid.

Those may be used alone or in combination of two or more kinds thereof.

The liquid containing the rubber-based release agent is preferably prepared using the above solvents so that a solid matter concentration falls in a range of 0.1 to 15% by mass in terms of convenience in coating. The liquid containing the rubber-based release agent can be coated on the undercoat layer described above in the same manner as in the case of coating the undercoat liquid by coating methods which have so far been publicly known.

A coating amount of the liquid containing the above rubber-based release agent is adjusted so that a thickness of the layer of a rubber-based release agent after cured is 0.05 to 0.5 μm, preferably 0.07 to 0.2 μm.

Adding the lithium salt-based antistatic agent to the undercoat layer and setting a thickness of the layer of a rubber-based release agent to 0.05 μm or more inhibit bleeding out of ionic substances derived from the antistatic agent onto the surface of the layer of a release agent and heavier releasing and allows no influences to be exerted on the releasing performance and the surface state. When using the lithium salt-based antistatic agent, the undercoat layer which is excellent in a wetting property and a smoothness is obtained, and therefore the release sheet in which a layer of a release agent is excellent in a smoothness can be provided.

Also, setting a thickness of the layer of a rubber-based release agent to 0.5 μm or less makes it possible to prevent blocking between the layer of a rubber-based release agent and the back surface of the release sheet substrate.

The liquid containing the rubber-based release agent is coated on the substrate on which the undercoat layer described above is coated and dried by heating at a temperature of 40 to 160° C. for 30 seconds to 1 minute, and then it is irradiated, if necessary, with an active energy beam to cross-link and cure the rubber-based release agent, whereby a layer of a release agent is formed.

The active energy beam used includes an electron beam and an ultraviolet ray, and an ultraviolet ray is preferred in terms of less damage (deterioration) given to the substrate.

A high pressure mercury lamp, a metal halide lamp, a high power metal halide lamp, an electrodeless lamp and the like which have so far been publicly known can be used as an ultraviolet ray lamp used for irradiating with an ultraviolet ray, and the electrodeless lamp is most suited in terms of a curing property of polybutadiene.

A dose of an ultraviolet ray falls preferably in a range of 30 to 300 mJ/cm$^2$ from the viewpoints of obtaining a high adhesion between the substrate of the release sheet and the release agent layer and obtaining light releasing strength.

Cross-linking by irradiating with an ultraviolet ray can more efficiently be carried out by using the liquid containing the release agent to which a photopolymerization initiator and a photosensitizer are added.

The specific examples of the photopolymerization initiator include 2,2-dimethoxy-1,2-diphenylethane-1-one, 1-hydroxy-cyclohexyl-phenyl-ketone, 2-hydroxy-2-methyl-1-phenyl-propane-1-one, 1-[4-(2-hydroxyethoxy)phenyl]-2-hydroxy-2-methyl-1-propane-1-one, 2-methyl-[4-(methylthio) phenyl]-2-morpholinopropane-1-one, 2-benzyl-2-dimethylamino-1-(4-morpholinophenyl) butanone-1, bis(2,4,6-trimethylbenzoyl) phenylphosphine oxide and oligo[2-hydroxy-2-methyl]-1-[4-(1-methylvinyl) phenyl]propanone.

The specific examples of the photosensitizer include aromatic ketones such as benzophenone, p,p'-dimethoxybenzophenone, p,p'-dichlorobenzophenone, p,p'-dimethylbenzophenone and acetophenone, and Those provide good results. In addition thereto, aromatic aldehydes such as terephthalaldehyde and the like and quinine-based aromatic compounds such as methylanthraquinone and the like can be used as well.

The pressure sensitive adhesive applied to the release sheet of the present invention shall not specifically be restricted, and it can suitably be selected from pressure sensitive adhesives which have so far been publicly known, such as acryl-based pressure sensitive adhesives, polyester-based pressure sensitive adhesives, urethane-based pressure sensitive adhesives and the like.

Adding the lithium salt-based antistatic agent to the undercoat layer provides the release sheet of the present with a stable antistatic property without being influenced by the air environment (moisture) and allows no influences to be exerted on a releasing performance and a surface state thereof. Further, the undercoat layer containing the lithium salt-based antistatic agent is excellent in a wetting property and a smoothness, and therefore there can be provided the release sheet in which a layer of a release agent is excellent in a smoothness and in which ionic substances derived from the lithium salt-based antistatic agent are inhibited from bleeding out onto the surface of the layer of a release agent.

EXAMPLES

Hereinafter, the present invention is explained in further details with reference to examples, but the present invention shall by no means be restricted by these examples.

In the examples and the comparative examples, measurements of a surface resistivity, a releasing strength and a Li/C amount and evaluation of a surface state were carried out by the following methods.

(1) Measurement of Surface Resistivity:

The surface resistivity was measured in order to confirm the antistatic property.

That is, a sample of 100 mm×100 mm was conditioned in humidity on the conditions of 23° C. and a relative humidity of 50% for 24 hours in accordance with JIS Standard (JIS K6911), and then a resistance value on the surface of the sample was measured to judge a value of $10^{14}$ Ω/sq or less to be good.

(2) Measurement of Releasing Strength:

An acryl-based pressure sensitive adhesive (a trade name: PL Shin, manufactured by Lintec Corporation) was coated (a coated amount after dried: 24 g/m$^2$) on a layer of a release agent surface of the release sheet which was a test object and stuck with a polyethylene terephthalate film (hereinafter called a PET film, a trade name: Lumirror E20 #50, thickness: 50 μm, manufactured by Toray Industries, Inc.), and a roller of 2 kg was reciprocated thereon one time to prepare a pressure sensitive adhesive sheet. The above pressure sensitive adhesive sheet was left standing on the conditions of a temperature of 23° C. and a relative humidity of 50% for one day, and then the releasing strength was measured. The measurement was carried out by peeling a substrate side of the pressure sensitive adhesive sheet in 180° direction at a speed of 300 mm/minute under the conditions of a temperature of 23° C. and a relative humidity of 50% by means of a universal tensile testing machine (TENSILON UTM-4-100, manufactured by ORIENTEC Co., Ltd.).

The release sheets having a releasing strength exceeding 1000 mN/20 mm bring about substantially heavier releasing, and those can not be used.

(3) Measurement of Li Amount (Atomic %):

In order to confirm the state of bleeding out of ionic substances derived from an antistatic agent in the release sheet, elemental analysis on the surface of the layer of a release agent in the release sheet which was a test object was carried out on the following conditions by X ray photoelectron spectroscopy (XPS).

Equipment for measurement: Quantera SXM manufactured by ULVAC-PHI, Inc.

X ray source: AlKα (1486.6 eV)

Output angle: 46 degree

Measured elements: lithium (Li) and carbon (C)

A value of Li/(Li+C) was multiplied by 100 to show the Li amount by "atomic %".

If the Li amount is detected, it shows that bleeding out is caused.

(4) Evaluation of Surface State:

The surface of the layer of a release agent in the release sheet was visually observed to evaluate it according to the following criteria.

◯: Not cloudy
X: Cloudy

Example 1

A solution (A) was prepared by adding a lithium-based antistatic agent [a trade name: Sankonol 0862-20R, lithium bis(trifluoromethanesulfonyl)imide manufactured by Sanko Chemical Co., Ltd.] to a solution (B) prepared by dissolving 100 parts by mass of a polyesterpolyol [a trade name: Crisvon 5150S, solid content: 50% by mass, manufactured by Dainippon Ink & Chemicals Inc.] and 5 parts by mass of an isocyanate compound [a trade name: Crisbon NX, manufactured by Dainippon Ink & Chemicals Inc.] into methylethyl ketone. Concentration of the antistatic agent was 10% by mass based on whole solid matter in the solution (A). Solid matter concentration was 1% by mass in the solution (B).

The solution (A) was applied as an undercoat layer on a PET film [a trade name: PET 38-T-100, manufactured by Mitsubishi Polyester Film Corp.] having a thickness of 38 µm so that a film thickness after dried was 0.15 µm, and it was dried at 100° C. for one minute to form an undercoat layer of the polyurethane-based resin.

A liquid of a release agent prepared by adding 1 part by mass of a hindered phenol base antioxidant (a trade name: Irganox HP2251, manufactured by Ciba Specialty Chemicals K.K.) to 100 parts by mass of polybutadiene (a trade name: Nipol BR1241, solid content: 5% by mass, manufactured by Nihon Zeon Corporation) and diluting them to a solid matter concentration of 0.5% by mass by toluene (a solvent) was applied on the undercoat layer, and it was dried at 100° C. for 30 seconds.

Then, the coated layer was irradiated with an ultraviolet ray on the condition of a conveyor speed of 40 m/minute (Ultraviolet ray irradiation condition: 100 mJ/cm$^2$) by means of a belt conveyor type ultraviolet ray irradiation device equipped with a "Fusion H bulb" having 240 w/cm which is an electrodeless lamp to cure it, whereby there was obtained a release sheet having a releasing layer in which a thickness is 0.1 µm.

Table 1 shows results for evaluation obtained by measurements of the surface resistivity, the releasing strength, the Li amount, and the surface state.

Example 2

A release sheet was obtained in the same manner as in Example 1, except that in Example 1, the antistatic agent of a lithium base (a trade name: Sankonol 0862-20R, manufactured by Sanko Chemical Co., Ltd.) was added so that a content of the antistatic agent based on the whole solid matter was 3% by mass. Table 1 shows results for evaluation obtained by measurements.

Example 3

A release sheet was obtained in the same manner as in Example 1, except that in Example 1, the antistatic agent of a lithium base (a trade name: Sankonol 0862-20R, manufactured by Sanko Chemical Co., Ltd.) was added so that a content of the antistatic agent based on the whole solid matter was 20% by mass. Table 1 shows results for evaluation obtained by measurements.

Example 4

A release sheet was obtained in the same manner as in Example 1, except that in Example 1, a film thickness of the undercoat layer after dried was changed to 1 µm. Table 1 shows results for evaluation obtained by measurements.

Comparative Example 1

A release sheet was obtained in the same manner as in Example 1, except that in Example 1, the antistatic agent of a lithium base (a trade name: Sankonol 0862-20R, manufactured by Sanko Chemical Co., Ltd.) was not added. Table 1 shows results for evaluation obtained by measurements.

Comparative Example 2

A release sheet was obtained in the same manner as in Example 1, except that in Example 1, a liquid prepared by diluting 100 parts by mass of polystyrene (a trade name: 331651-25G, manufactured by Aldrich Co., Ltd.) to a solid matter concentration of 0.5% by mass by toluene (a solvent) was applied as an undercoat layer so that a film thickness after dried was 0.1 µm, and it was dried at 100° C. for 30 seconds. Table 1 shows results for evaluation obtained by measurements.

Comparative Example 3

A release sheet was obtained in the same manner as in Example 1, except that in Example 1, the liquid of a release agent was applied so that a film thickness was 0.02 µm.

Table 1 shows results for evaluation obtained by measurements.

Comparative Example 4

A release sheet was obtained in the same manner as in Example 1, except that in Example 1, the antistatic agent of a lithium base (a trade name: Sankonol 0862-20R, manufactured by Sanko Chemical Co., Ltd.) was added so that a content of the antistatic agent based on the whole solid matter was 50% by mass. The measurement and evaluation are results shown in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| (Release sheet) Material of undercoat layer | | | | | | | | |
| Polyurethane | ○ | ○ | ○ | ○ | ○ |  | ○ | ○ |
| Polystyrene |  |  |  |  |  | ○ |  |  |
| Thickness (μm) of undercoat layer | 0.15 | 0.15 | 0.15 | 1.0 | 0.15 | 0.15 | 0.15 | 0.15 |
| Content (% by mass) of antistatic agent | 10 | 3 | 20 | 10 | 0.0 | 10 | 10 | 50 |
| Thickness (μm) of layer of a release agent | 0.1 | 0.1 | 0.1 | 0.1 | 0.1 | 0.1 | 0.02 | 0.1 |
| (Measurement and evaluation results) | | | | | | | | |
| (1) Surface resistivity (Ω/sq) | | | | | | | | |
| Undercoat layer | $2.37 \times 10^{12}$ | $9.15 \times 10^{13}$ | $6.61 \times 10^{11}$ | $1.89 \times 10^{13}$ | $5.23 \times 10^{16}$ | $1.11 \times 10^{12}$ | $1.02 \times 10^{12}$ | $3.24 \times 10^{11}$ |
| Layer of a release agent | $2.28 \times 10^{12}$ | $9.69 \times 10^{13}$ | $6.97 \times 10^{11}$ | $1.63 \times 10^{13}$ | $3.46 \times 10^{16}$ | $3.12 \times 10^{12}$ | $1.12 \times 10^{12}$ | $3.75 \times 10^{11}$ |
| (2) Releasing strength (mN/20 mm) | 83 | 88 | 89 | 92 | 87 | 6000 | 9000 | 8600 |
| (3) Li amount (atomic %) | 0.0 | 0.0 | 0.0 | 0.0 | 0.0 | 0.6 | 0.0 | 0.1 |
| (4) Surface state | ○ | ○ | ○ | ○ | ○ | X | ○ | X |

What is claimed is:

1. A release sheet characterized by providing an undercoat layer containing a polyurethane resin and 0.1 to 45% by mass of a lithium salt antistatic agent and a layer of a rubber release agent formed by coating and drying a liquid containing a release agent on the undercoat layer.

2. The release sheet as claimed in claim 1, wherein the liquid containing a release agent is coated, dried and cured by irradiating with an active energy beam to thereby form the layer of a rubber release agent.

3. The release sheet as claimed in claim 2, wherein the active energy beam is an ultraviolet ray.

4. The release sheet as claimed in any one of claims 1 to 3, wherein the undercoat layer has a thickness of 0.05 to 2 μm.

5. The release sheet as claimed in any one of claims 1 to 3, wherein the layer of a rubber release agent has a thickness of 0.05 to 0.5 μm.

6. A release sheet, comprising:
   an undercoat layer comprising a polyurethane resin and a lithium salt antistatic agent, wherein the lithium salt antistatic agent is present in the undercoat layer in an amount of from 0.1 to 45% by mass based on the total mass of the undercoat layer;
   a release layer comprising a release agent; and
   a substrate;
   wherein the release layer covers the undercoat layer and the substrate and is directly adjacent to the undercoat layer, and the undercoat layer covers the substrate and is directly adjacent to the substrate.

7. The release sheet of claim 6, which is free of silicone materials.

8. The release sheet of claim 7, further comprising an adhesive layer covering and directly adjacent to the release layer.

9. The release sheet of claim 8, wherein the adhesive layer comprises at least one adhesive selected from the group consisting of an acryl adhesive, a polyester adhesive and a urethane adhesive.

10. The release sheet of claim 9, wherein the substrate is a polyester film.

11. The release sheet of claim 10, wherein the antistatic agent present in the undercoat layer is lithium bis(trifluoromethanesulfonyl) imide.

12. The release sheet of claim 10, wherein the antistatic agent is present in the undercoat layer in an amount of 2 to 30% by mass based on the total mass of the undercoat layer.

13. The release sheet of claim 10, wherein the undercoat layer has a thickness of 0.05 to 2 μm.

14. The release sheet of claim 10, wherein the release agent present in the release layer is at least one selected from the group consisting of a butadiene rubber, a styrene/butadiene rubber, a chloroprene rubber, a butyl rubber, an ethylene propylene rubber, and an acryl rubber.

* * * * *